Feb. 14, 1950 H. R. ANSEL 2,497,572
PERCOLATOR
Filed Jan. 11, 1946 3 Sheets-Sheet 1

Inventor:
Harry R. Ansel
by Albert G. McCaleb
Atty.

Feb. 14, 1950  H. R. ANSEL  2,497,572
PERCOLATOR
Filed Jan. 11, 1946  3 Sheets-Sheet 2
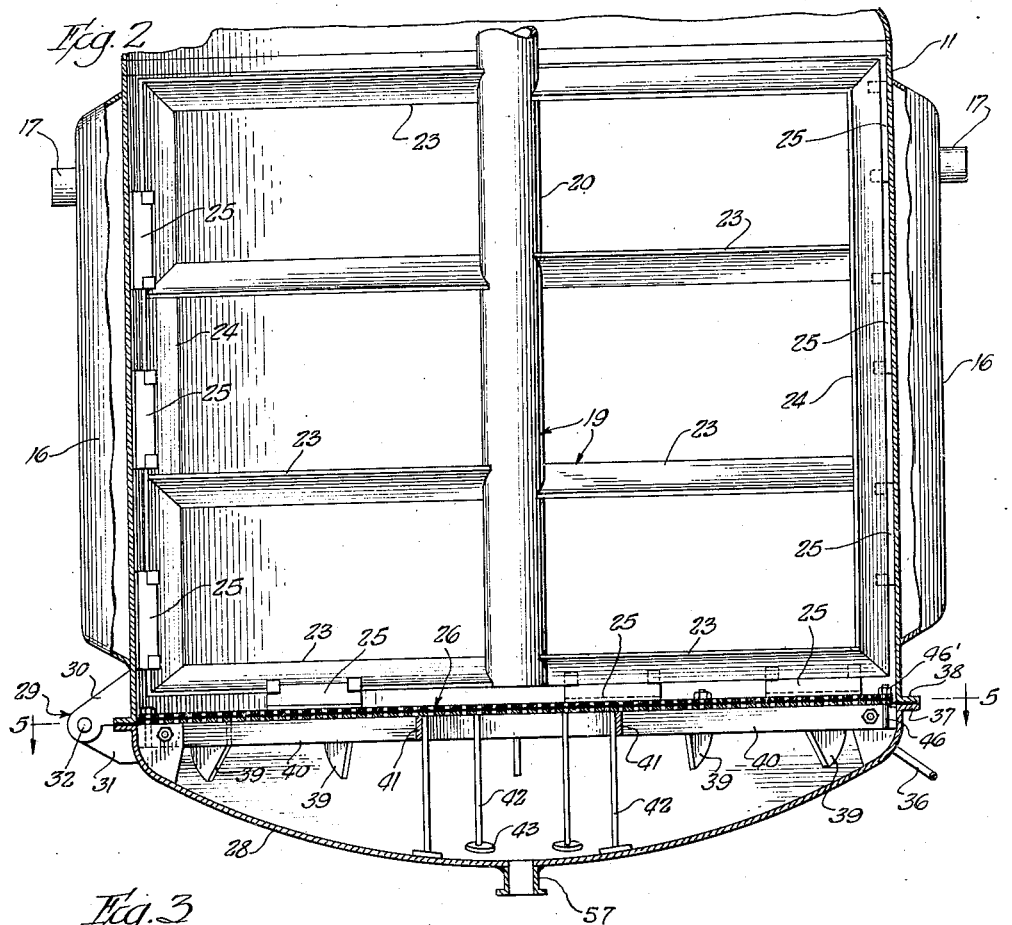
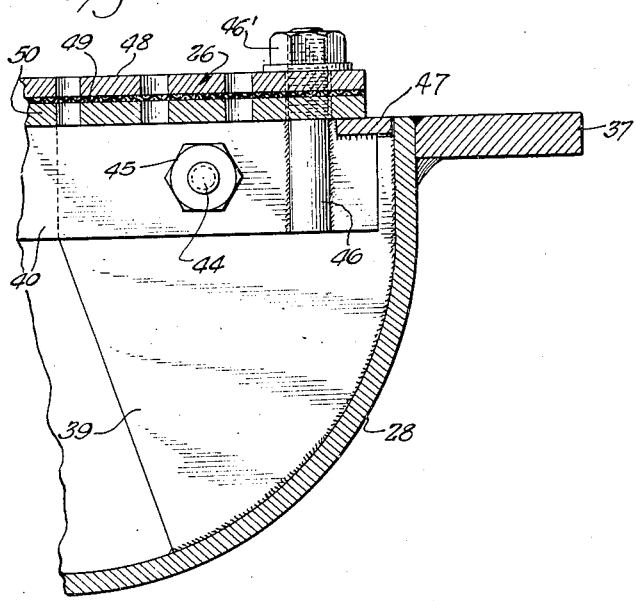
Inventor
Harry R. Ansel
By Albert G. McCaleb
Atty.

Feb. 14, 1950 H. R. ANSEL 2,497,572
PERCOLATOR
Filed Jan. 11, 1946 3 Sheets-Sheet 3

Inventor
Harry R. Ansel
By Albert G. McCabb
Atty.

Patented Feb. 14, 1950

2,497,572

UNITED STATES PATENT OFFICE 2,497,572

PERCOLATOR

Harry R. Ansel, Oak Park, Ill., assignor to Wm. J. Stange Co., Chicago, Ill., a corporation of Illinois Application January 11, 1946, Serial No. 640,621

4 Claims. (Cl. 210—185)

My invention relates to percolators and more particularly to percolators used in those industrial processes by which essential oils or oleoresins of other soluble products are extracted from plant solids or other materials from which such products are obtainable.

Generally speaking, the objects of my invention are to increase the operating efficiency of such percolators, to facilitate the maintenance and cleaning thereof, and render their filter elements readily accessible for inspection, repair or replacement.

More specifically, an object of my invention is to provide a percolator with a readily accessible and otherwise satisfactory filter.

Another object of my invention is to provide a percolator with a readily accessible filter of the type comprising a pair of perforated filter plates and an interposed filter sheet.

Another object of my invention is to provide a percolator with a readily accessible filter, suitably and preferably comprising several superposed elements, which constitutes an inner or false bottom spaced from the outer or true bottom of the percolator and is well protected against downward collapse under the weight of the percolator contents.

Still another object of my invention is to provide a percolator with a readily accessible filter which constitutes an inner or false bottom for the percolator and has its upper surface continuously effectively scraped during the operation of a mechanical agitator with which the percolator is equipped.

Yet another object of my invention is to provide novel and dependable means for accessibly, replaceably and adequately supporting a filter upon and in spaced relation to a percolator bottom.

In achieving the aforestated objects, I prefer to provide a percolator with a hingedly mounted bottom door on and in spaced relation to which the filter is mounted and supported.

The hereinbefore-mentioned and other features, objects and advantages of my invention will appear from the description to follow wherein reference is made to the accompanying three sheets of drawings in which:

Fig. 2 is a fragmentary vertical sectional view of the percolator revealing the relative positions of the agitator, the filter elements and the bottom door;

Fig. 3 is a fragmentary vertical sectional view of the bottom door and the filter elements;

Figure 1:
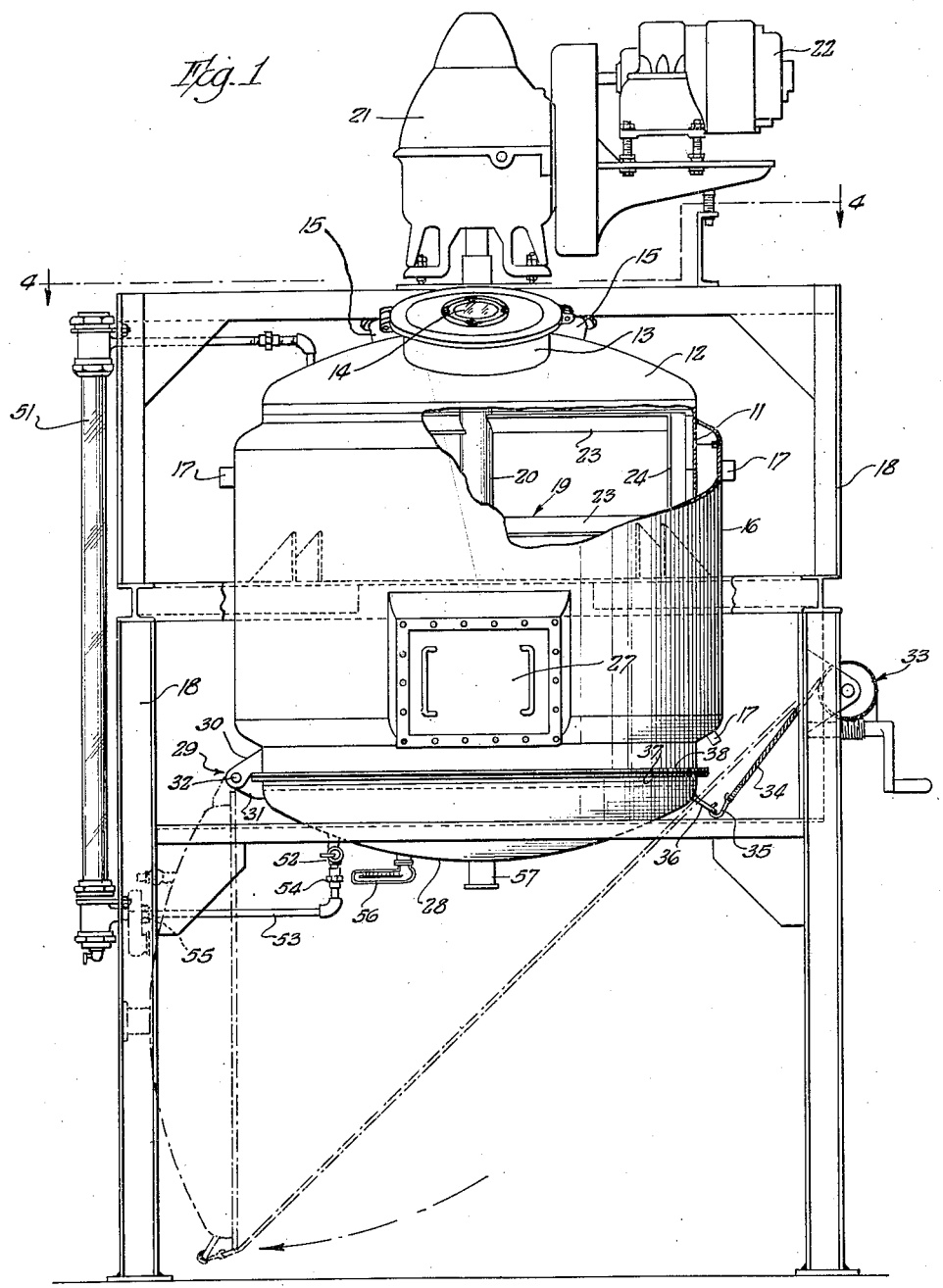
Fig. 1 is a front elevational view depicting a percolator of my invention with certain parts broken away to reveal interior mechanism and by dotted lines indicating the open position of the bottom door.
Figure 4:
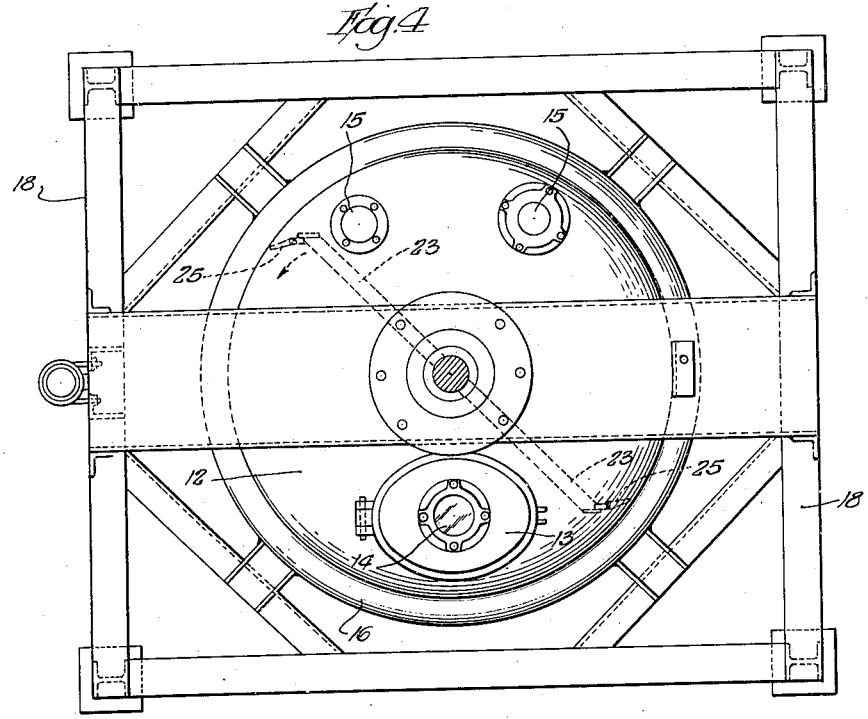
Fig. 4 is a top plan view which may be regarded as taken in the planes of the line 4—4 of Fig. 1.
Figure 5:
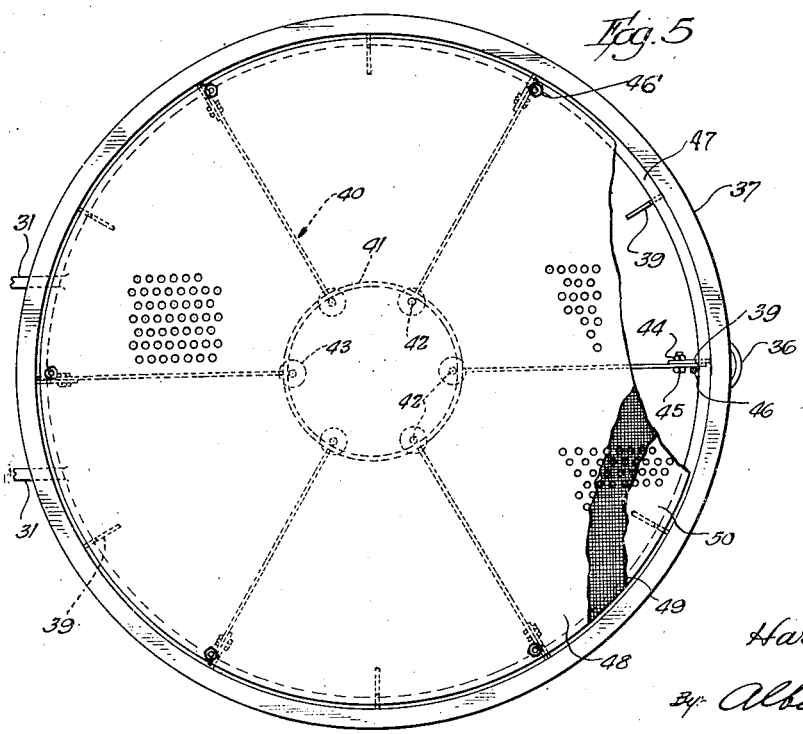
Fig. 5 is a top view, which may be regarded as taken in the plane of the line 5—5 of Fig. 2, of the bottom door and the filter elements, certain portions of such elements being broken away to reveal parts therebeneath.

In the drawings, wherein like reference numerals designate corresponding parts throughout the several views, 11 indicates a tank-like receptacle which is of generally cylindrical form and has a cover 12 provided with a manhole 13. The cover of manhole 13 may be provided with a window 14 of glass or other suitable material through which the interior of the percolator is visible. A pair of inlet pipes 15, suitably flanged to facilitate their connection with solvent supply pipes, are carried by cover 12.

Heating of the contents of the receptacle 11 is accomplished by circulating steam through the jacket chamber 16 having suitable inlet and outlet pipes 17.

Carrying the percolator a substantial distance above a suitable supporting floor is a frame 18 which suitably may be provided with appropriate gussets fixedly carrying plates which in turn are welded to the exterior wall of the jacket chamber 16.

Receptacle 11 is provided with an agitator 19 which is best illustrated in Fig. 2. Such agitator may include a vertically disposed rotatable shaft 20 driven through a speed reducer 21 by an electric motor 22. Suitable radial and thrust bearings (not shown) for the shaft 20 may be presumed to be carried by cover 12. Fixed to and radiating from shaft 20 are vertically spaced-apart arms 23 having their outer ends fixedly attached to vertical bars 24. Each of the arms 23 desirably occupies an inclined plane; and adjacent arms in each vertical row, and radially aligned arms, preferably occupy reversely inclined planes as shown.

Scrapers 25 are hingedly connected to the vertical bars 24 and to the lowermost two of the horizontal arms 23; with that free edge of each scraper which lies away from its hinged edge being its leading edge as the agitator rotates. The scrapers 25, carried by each vertical bar 24, desirably are staggered with respect to those carried by the other of said bars. Similarly the scrapers carried by one of the two lowermost horizontal arms 23 are staggered with respect to the scraper carried by the other of said arms, so that each revolution of the agitator 19 will result in the scraping of substantially all of the upper surface of the inner or false bottom 26 of the receptacle 11. The filter elements which constitutes such inner or false bottom, and the devices by which they are carried and supported by the outer or true bottom of such receptacle 11, presently will be described.

A door 27 desirably affords access to the receptacle 11 through the vertical cylindrical wall thereof to permit the removal when necessary or desirable of the solid matter supported by the aforementioned inner or false bottom 26.

The outer or true bottom of the receptacle 11 is in the form of a bottom door 28. Such bottom door is spheroidally concavo-convex in vertical section and bulges downwardly. It is swingable with respect to receptacle 11, between the closed and open (dotted line) positions of Fig. 1, on a hinge 29 which suitably may comprise conventionally cooperating lugs 30 and 31 and pin 32.

Bottom door 28 may be moved to its closed position, or permitted to gravitate to its open position, by operating a hand winch 33 which suitably may be carried by frame 18. Rope or cable 34 with which the winch cooperates desirably is provided with a hook 35 engageable with eye 36 welded or otherwise secured to door 28 at a point approximately diametrically opposite hinge 29. The winch, if of the worm-driven-drum type shown, may be relied upon to hold the bottom door 28 in its raised or closed position when moved thereto. When door 28 is in its raised or closed position, its peripheral annular flange 37 cooperates with a matching flange 38 carried by the lower end of receptacle 11. A suitable compressible annular gasket, diagrammatically indicated by the heavy black line between the flanges 37 and 38, is disposed between those flanges, and a multiplicity of conventional C clamps or equivalent clamping devices (not shown) are employed tightly to squeeze the gasket between such flanges.

Preferably welded edgewise to the inner surface of the bottom door 28, are the vertically disposed equidistantly spaced-apart bracket plates 39 (see Figs. 2 and 3). These bracket plates 39 constitute carriers for a spider 40 which underlies and is attached to the inner or false bottom 26 whereto reference previously has been made.

Spider 40 comprises a central ring 41 from which conventional spider legs radiate, and welded or otherwise secured to the ring 41 are additional equidistantly spaced-apart legs 42 which extend away from the ring 41 axially thereof to present feet or pads 43 bearing against the inner surface of the door 28 in the region of its maximum bulge. The outer ends of the radial legs of the spider 40 are detachably secured to the spider carriers 39 by bolts 44 and their cooperating nuts 45.

Welded or otherwise secured to the outer ends of the radiating legs of the spider 40, are the upwardly projecting stud bolts 46 which, in cooperation with their associated nuts 46', serve to secure the aforementioned inner or false bottom 26 atop the spider. A ring 47, for the accommodation of which the outer ends of the spider legs and the spider carriers 39 are notched, is appropriately welded or otherwise secured to such legs to prevent the downward escape of the receptacle contents past the periphery of the inner or false bottom 26.

Such inner or false bottom 26 is a filter and preferably comprises upper and lower perforated filter plates 48 and 50 and an interposed filter sheet 49. The three filter elements desirably are formed of stainless steel; corresponding perforations of the upper and lower plates 48 and 50 preferably are disposed in registry, and the filter sheet 49 preferably is in the form of a fine mesh screen. Each of these three filter elements is provided with a plurality of apertures for the passage of the aforementioned stud bolts 46.

Carried by the frame 18 is a conventional device 51, the details of which are not essential to the present invention and need not be described. Suffice it will to say that the device 51 affords a visual indication of the amount or depth of the solvent contained by the receptacle 11 at any given time, and also may serve automatically to control the flow of solvent through a conventional extraction circuit (not shown), e. g., a circuit including the percolator, a pump, a still, a condenser, and appropriate pipes or other solvent conduits.

A valve 52 may be closed, to guard against subsequent undesirable leakage of solvent from the receptacle, when the pipe section 53 (being one of the two connections between the percolator and the dual-purpose device 51) is removed from between its cooperating unions 54 and 55 as a necessary preliminary to the opening of the bottom door 28.

A thermostat 56, for indicating the temperature in the lowermost portion of the percolator, is carried by bottom door 28, and such door also carries an outlet pipe 57 through which solvent may be circulated or otherwise withdrawn from the percolator.

A typical use of my improved percolator is as follows:

Solid matter containing a soluble product to be extracted is dumped or shoveled into manhole 13 which is then closed.

A starting quantity of a suitable solvent is admitted through one of the inlet pipes 15 carried by the percolator cover 12—it being assumed that the other inlet pipe 15 and the outlet pipe 57 carried by the bottom door 28 are both included in the aforementioned conventional extraction circuit (not shown).

Steam to heat the contents of the percolator is supplied to the jacket 16.

The agitator 19 is set in operation to accelerate the transfer to the solvent from the solid matter of the soluble product being extracted.

After sufficient heating and agitation, and with the agitator 19 still operating to prevent accumulations of solid matter from objectionably impeding the downward flow of liquid through the false bottom 26 composed of the filter elements 48, 49 and 50, the menstruum resultant from the intimate association of the solvent and solid matter is pumped or otherwise drawn off through pipe 57 to a suitable still (not shown) which serves, in well-known manner, to separate the extracted product from the solvent.

The wet mass within the receptacle 11 is permitted to drain through the filter elements into the bottom door.

A fresh supply of solvent (returned from the still or coming from the original source of solvent supply) is admitted to the receptacle 11 through one or both of the pipes 15 and is permitted to trickle down through the solid matter in the receptacle.

The foregoing cycle of operations is repeated as frequently and as often as is found necessary or desirable.

When the extraction process has been completed, the solid matter remaining in the receptacle above the false bottom constituted by the filter elements is permitted to drain to a dry or substantially dry state and is removed, in whole or in part, through the door 27.

Whenever it is necessary or desirable to inspect, clean, repair or replace the filter elements, or for a workman to obtain access to the interior of receptacle 11 to clean said receptacle, or to repair the agitator 19 or its scrapers 25 or for any other purpose, the winch 33 is operated to permit gravitation of the bottom door to its open position (after the removal of pipe 53 and the C clamps or equivalent devices by which the flanges 37 and 38 are clamped together).

Having thus illustrated and described a preferred embodiment of my invention, what I claim as new and desire to secure by Letters Patent of the United States is:

1. In a percolator, a receptacle having a door-closed opening in the bottom thereof, a bottom door hingedly mounted on the lower portion of the receptacle to cooperate with said opening; said door being downwardly dished to provide a chamber for filtered menstruum, a filter of less area than the aforementioned opening, said filter provided adjacent its periphery with bolt holes, and devices for detachably mounting the filter on the door and contiguously to the lower portion of the receptacle in such manner that when the door is closed the filter is well adapted to support a heavy load of solid matter and solvent occupying the receptacle without permitting downward escape of unfiltered material into the aforementioned chamber for filtered menstruum, said devices comprising a spider disposed and secured within the door and having the outer extremities of its legs lying adjacent to the door rim, bolts projecting upwardly from the spider and extending through the aforementioned bolt holes of the filter to hold the filter upon the spider with the periphery of the filter spaced inwardly from the adjacent inner surfaces of the door and receptacle when the door is closed, and an annular filter seat which lies closely adjacent to the lower portion of the receptacle when the door is closed carried by the extremities of the spider legs and having its outer edge continuously contiguous to the inner surface of the door and its upper surface continuously contacting the under peripheral margin of the filter.

2. In a percolator, a receptacle having a door-closed opening in the bottom thereof, a bottom door hingedly mounted on the lower portion of the receptacle to cooperate with said opening, said door being downwardly dished to provide a chamber for filtered menstruum, and filter supporting and securing devices mounted on the door, said devices comprising a spider disposed within the door and having the outer extremities of its legs secured to the door adjacent the rim thereof, bolts projecting upwardly from the spider legs adjacent the ends thereof for securing the margin of the filter thereto and an annular filter engageable seat carried by the door outwardly of said bolts and having its outer edge contiguous to the inner surface of the door and its upper surface disposed for supporting the under peripheral margin of the filter when the filter is bolted to the spider.

3. A combination as specified in claim 2 wherein the extremities of the spider legs are detachably secured to the door adjacent the rim thereof and wherein the spider legs radiate from a central annulus from which depend a plurality of legs having feet which freely bear against the inner wall of the central portion of the downwardly dished door.

4. In a percolator receptacle having a door-closed opening in the bottom thereof; a door hingedly mounted on the bottom of the receptacle to cooperate with said opening, said door being dished on the side facing said opening to provide a chamber for filtered menstruum, a filter plate of less area than the aforementioned opening for fitting thereinto, and devices for supporting and securing said filter plate on said door for movement therewith relative to said opening, said devices comprising a plurality of spaced bracket plates projecting from the dished surface of the door in vertical planes radiating from a common axis, a spider disposed within the door and having the outer extremity of each of its legs disposed alongside of and secured to one of said bracket plates, stud bolts projecting upwardly from the spider legs to extend through registering holes in the filter plate and positioning same thereon, and an annular filter seat supported on the spider legs and brackets and having its outer edge contiguous to the inner surface of the door and its upper surface contacting the under peripheral portion of the filter plate, when these are in assembled relation on said door.

HARRY R. ANSEL.

REFERENCES CITED

The following references are of record in the file of this patent:

UNITED STATES PATENTS

| Number | Name | Date |
|---|---|---|
| 626,991 | Eberhard | June 13, 1899 |
| 700,033 | Glatz | May 13, 1902 |
| 1,000,086 | Goetz et al. | Aug. 8, 1911 |
| 1,638,530 | Hoskins | Aug. 9, 1927 |
| 1,861,537 | Leek | June 7, 1932 |
| 2,082,752 | Lewis et al. | June 1, 1937 |
| 2,110,384 | Reynolds | Mar. 8, 1938 |
| 2,253,500 | Arango | Aug. 26, 1941 |
| 2,327,803 | Kidd | Aug. 24, 1943 |
| 2,355,069 | Green | Aug. 8, 1944 |

FOREIGN PATENTS

| Number | Country | Date |
|---|---|---|
| 11,957 | Great Britain | Aug. 31, 1905 |
| 559,642 | France | Dec. 9, 1922 |